Nov. 10, 1925.
D. F. McMAHON
1,560,594
SHOCK ABSORBER
Filed Oct. 24, 1924  2 Sheets-Sheet 1
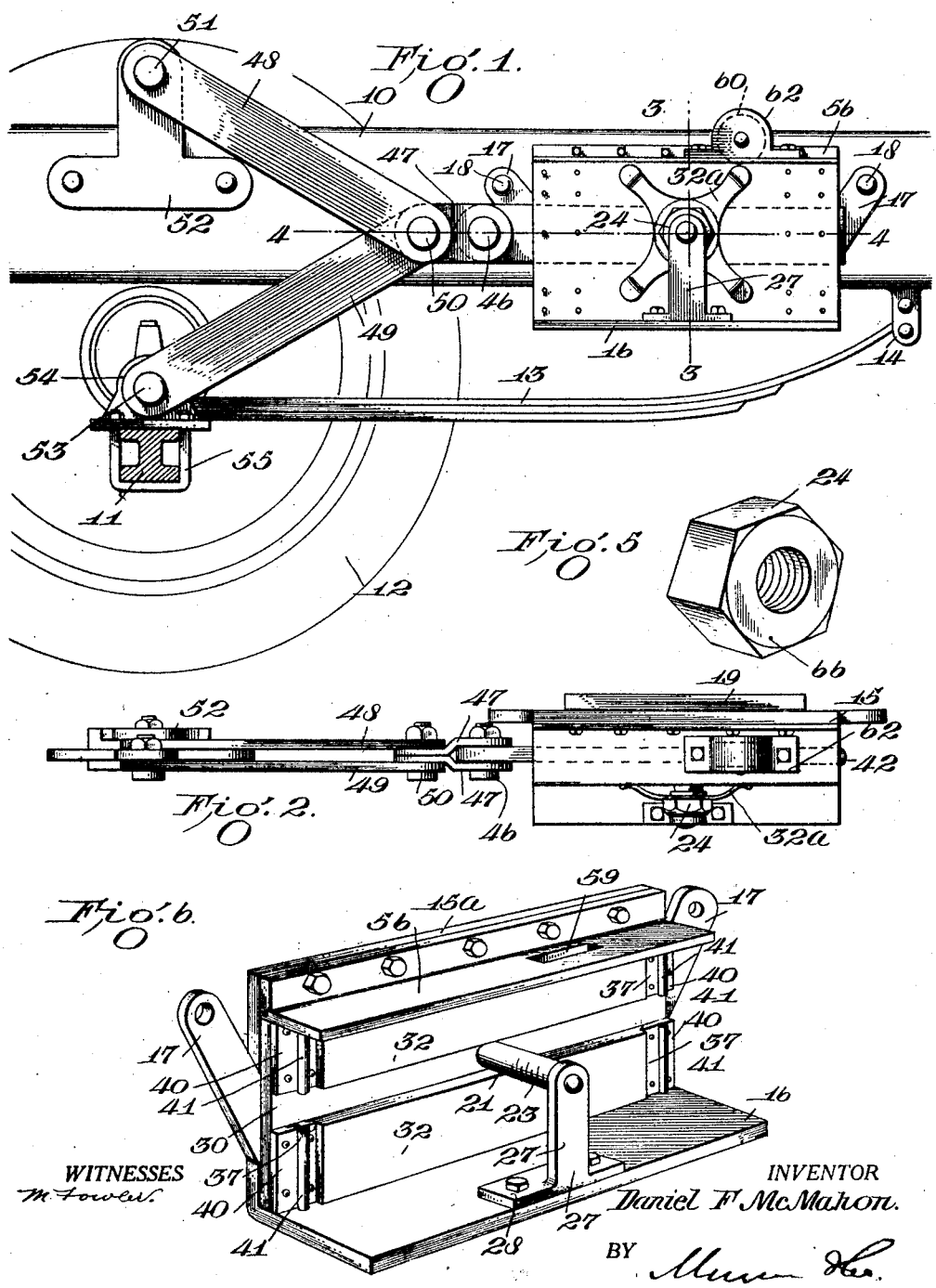
WITNESSES
INVENTOR
Daniel F. McMahon.
BY
ATTORNEYS Nov. 10, 1925.
D. F. McMAHON
SHOCK ABSORBER
Filed Oct. 24, 1924
1,560,594
2 Sheets-Sheet 2
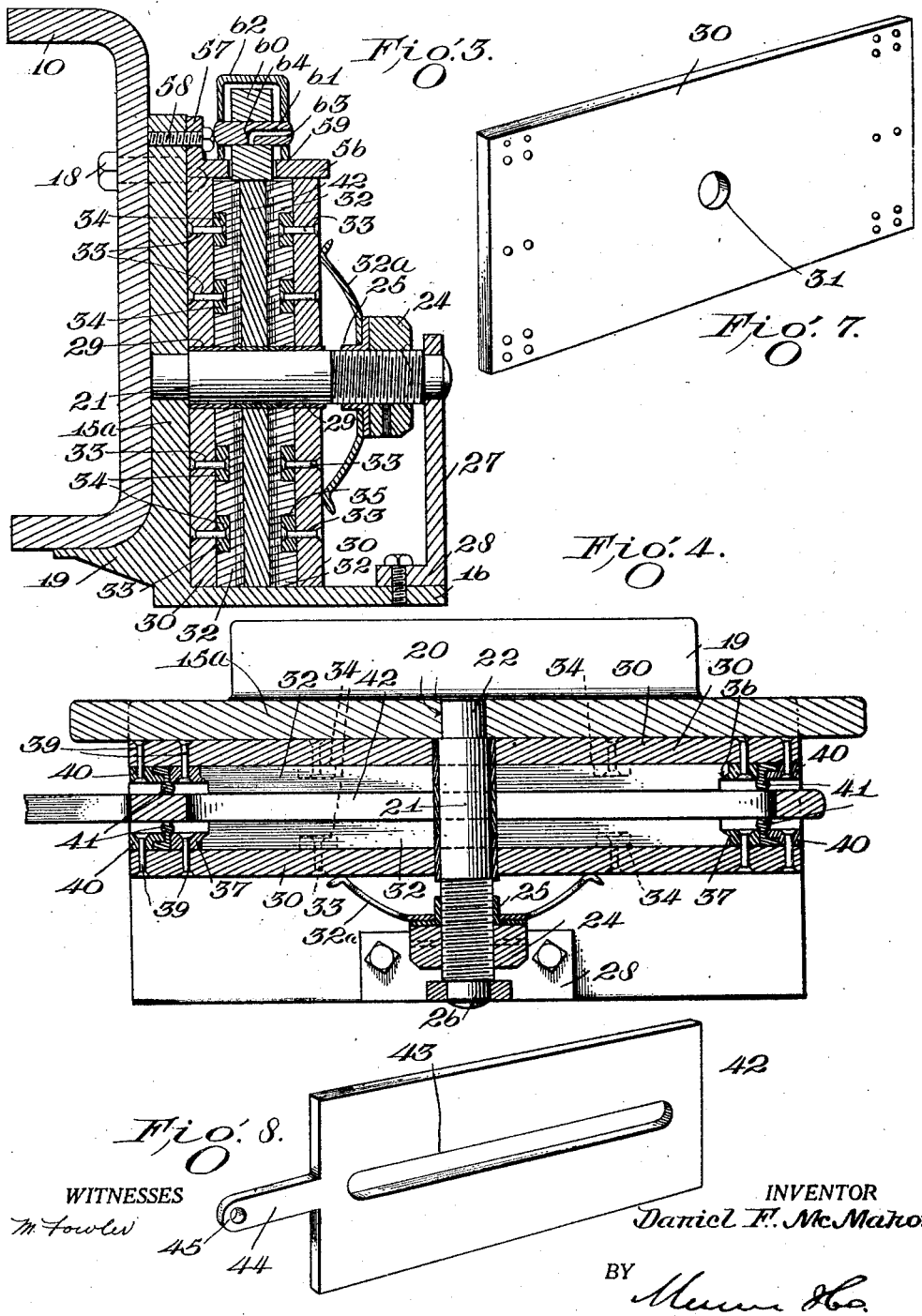
WITNESSES
M Fowler
INVENTOR
Daniel F. McMahon
BY
ATTORNEYS Patented Nov. 10, 1925.

1,560,594

UNITED STATES PATENT OFFICE.

DANIEL FRANCIS McMAHON, OF CICERO, ILLINOIS.

SHOCK ABSORBER.

Application filed October 24, 1924. Serial No. 745,625.

*To all whom it may concern:*

Be it known that I, DANIEL F. McMAHON, a citizen of the United States, and a resident of Cicero, in the county of Cook and State of Illinois, have invented certain new and useful Improvements in Shock Absorbers, of which the following is a specification.

This invention relates to shock absorbers and has for its object the provision of a device having a pair of cooperating rods connected to a sliding plate frictionally resisted in its movement, with the rods being operated through the relative movements of the device and an axle.

A further object of the invention is the provision of a device adapted to absorb vehicle shocks incident to road travel and in which abrasive plates resiliently maintained in frictional engagement with a sliding plate restrains the movement of the sliding plate, said plate being actuated through connections with parts of a vehicle which are moved relative to each other during such road shocks.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side elevation of a shock absorber shown connected to a vehicle.

Figure 2 is a plan view of the same.

Figure 3 is a transverse vertical section taken along the line 3—3 of Figure 1.

Figure 4 is a horizontal section taken along the line 4—4 of Figure 1.

Figure 5 is a view in perspective of a nut lock.

Figure 6 is a view in perspective of the supporting bracket for the shock absorber showing abrasive plates in position.

Figure 7 is a view in perspective of the fixed plate forming one of the elements of the shock absorber.

Figure 8 is a view in perspective of the sliding plate of the shock absorber.

Referring more particularly to the drawings, 10 designates a channel beam of the chassis frame of the vehicle, 11 is an axle supporting the wheel 12. A vehicle spring 13 is connected between the axle 11 and a spring shackle 14 connected with the channel beam 10. Such parts as have just been mentioned form well known parts of the construction of an automobile.

Secured to a face of each channel beam 10 is a bracket 15 having a horizontal portion 16 extending laterally from the channel beam 10. Perforated lugs 17 project outwardly from the opposite ends of the back of the bracket 15 and said lugs are secured to the channel beam by means of bolts 18. At the back of the bracket 15 and adjacent its lower end is provided a rearwardly projecting member 19 which is shaped to conform to the shape of the lower end of the channel member 10 whereby the projection 19 cooperating with the bolts 18 aid in locking the bracket rigidly to the channel member. The back 15ª of the bracket 15 is provided with a central perforation 20 in which is inserted a reduced end of a bolt 21, the reduced end 22 of said bolt being welded or otherwise rigidly secured to the plate 15ª. The forward end of the bolt 21 is threaded as shown at 23 to receive a nut 24 and a flanged sleeve 25. The outer reduced end 26 of the bolt 21 is received within a perforation in the upper end of a standard 27 which is secured by means of bolts passing thru a base 28 integrally formed with the standard, the said base being bolted to the lateral projection 16 of the bracket 15. The bolt 21 has shrunk thereon a plurality of bushings 29.

A pair of plates 30 which I term fixed plates due to the fact that they are intended to be maintained against any form of movement, are provided with a central perforation 31, as shown in Figure 7, through which is inserted the bolt 21. The plate 30 has one face in engagement with the inner face of the back 15ª of the bracket 15. The other plate is adapted to be engaged by the feet of a spider spring 32ª. The spring has a central perforation through which is inserted the flanged sleeve 25.

A pair of friction plates 32 are removably connected with each fixed plate 30 by means of rivets 33 secured to the fixed plate 30 and projecting within a pocket 34 of the friction plates 32. A disc 35 is mounted on the end of the rivet 33 where the same projects into the pocket 34. It will be seen that a pair of these plates 32 are removably connected to a fixed plate 30 and that one plate is located above the bolt 21 while the other plate is located in spaced relation below the bolt as shown in Figure 6. These friction plates fall short of the length of the fixed plate and terminate in a cut out portion as shown at 36 in Figures 4 and 6. A stop 37 is located at each end of the friction plates 32 and has an edge shaped to conform to the end edge of the abrasive plates, the outer edge of the plates being straight. These stops are secured by means of rivets 39 to the outer ends of the fixed plates 30. A clamping member 40 is riveted to each end of the fixed plates 30 and in spaced relation to the stops 37, and the inner end of a wiper 41 is clamped rigidly between the clamping member 40 and the stop 37. The wipers 41 are adapted to brush the opposite faces of a sliding plate 42. This plate has its opposite faces generally in rigid contact with the abrasive surfaces of the plates 32 so that a certain amount of frictional resistance will be exerted upon the plate 42 during its actuation by certain movable elements of the vehicle. This sliding plate, as shown in Figure 8, is provided with a longitudinal slot 43 adapted to receive the bolt 21 whereby the plate is adapted to slide for a considerable portion of its length between the abrasive plates 42. One end of the plate is provided with a lug 44 having a perforation 45 to receive a bolt 46 passing through the perforated connecting members 47. The other ends of the connecting members are embraced between a pair of actuating arms 48 and 49 and are secured to the members 47 by means of a bolt 50.

The outer free end of the rod 48 is pivotally connected at 51 to a bracket 52 rigidly secured to the channel frame 10 of the chassis frame. The rod 49 is pivotally connected at 53 to a hanger 54 which is connected by means of a U-shaped clamp 55 to the axle 11.

A cover 56 is secured to the back 15ª by means of the flange 57 and the studs 58 and is provided with an opening 59 adjacent the end in which revolves a roller 60. This roller is mounted upon an axle 61 rigidly secured in the openings of the side wall of a housing 62. This housing is bolted to the cover 56. The axle 61 is provided with an axial passage 63 terminating in a radial passage 64 and an oil cup is connected with the axial passage 63 for supplying lubricant to the roller 60. The peripheral edge of the roller is adapted to be retained in contact with the upper edge of the sliding plate 42.

In the operation of my device it will be noted that due to road shocks the wheel 12 may be forced upwardly and cause the axle 11 to be moved in close association with the beam 10 of the chassis frame so that the rods 48 and 49 will be moved at their outer ends toward each other and cause the bolt 50 to travel forwardly of the axle 11 and move the plate 42 inwardly and between the friction plates 32. Due to the frictional surface of the plates 32 they will resist movement of the plate 42 and tend to check the relative movements of the axle in the frame 10 so that the road shocks will be absorbed whether the axle is being moved towards the frame 10 or whether the frame 10 is being moved towards the axle 11. The plate 42 will always be oscillated between the plates 32, during the reciprocation of said plates, the wipers 41 being in contact with the sliding plate will wipe the surfaces and will further prevent the accumulation of dust being collected in the shock absorber.

The spring 32ª will maintain the various plates pressed into engagement with each other by reason of the adjustment of the nut 24.

What I claim is:

1. A shock absorber for vehicles comprising a sliding plate, friction plates maintained in engagement with the sliding plate to resist movement thereof, a pair of rods adapted to connect the sliding plate with the chassis and an axle of said vehicle, and a roller mounted to engage one edge of the sliding plate.

2. A shock absorber for vehicles comprising a sliding plate, friction plates maintained in engagement with the sliding plate to resist movement thereof, a pair of rods adapted to connect the sliding plate with the chassis and an axle of said vehicle, said sliding plate being slotted, a fixed bolt passing through said slot for guiding the sliding plate, and a roller mounted to engage one edge of the sliding plate.

DANIEL FRANCIS McMAHON.